US010500807B2

(12) United States Patent
Klaer et al.

(10) Patent No.: US 10,500,807 B2

(45) Date of Patent: Dec. 10, 2019

(54) PRESSURE ROLLER STATIONS FOR ROTARY PRESSES HAVING TWO PRESSURE ROLLER AXLES FOR RECEIVING PRESSURE ROLLERS

(71) Applicant: Korsch AG, Berlin (DE)

(72) Inventors: Ingo Klaer, Berlin (DE); Wolfgang Korsch, Berlin (DE); Juergen Boehnlein, Berlin (DE)

(73) Assignee: Korsch AG, Berlin (DE)

( * ) Notice: Subject to any disclaimer, the term of this patent is extended or adjusted under 35 U.S.C. 154(b) by 568 days.

(21) Appl. No.: 15/345,261

(22) Filed: Nov. 7, 2016

(65) Prior Publication Data

US 2017/0050401 A1 Feb. 23, 2017

Related U.S. Application Data

(63) Continuation of application No. PCT/EP2015/059946, filed on May 6, 2015.

(30) Foreign Application Priority Data

May 7, 2014 (EP) .................................... 14167415

(51) Int. Cl.
*B29C 43/08* (2006.01)
*B30B 11/08* (2006.01)

(52) U.S. Cl.
CPC .................................... *B30B 11/08* (2013.01)

(58) Field of Classification Search
CPC ................................ B30B 11/08; B29C 43/08
See application file for complete search history.

(56) References Cited

U.S. PATENT DOCUMENTS

| | | | |
|---|---|---|---|
| 2,846,723 A | 8/1958 | Frank | |
| 3,891,375 A | 6/1975 | Pilewski et al. | |
| 6,186,762 B1 | 2/2001 | Matthes | |
| 7,364,420 B2 * | 4/2008 | Luneburg | B30B 11/08 425/345 |
| 8,550,804 B2 | 10/2013 | Mies et al. | |
| 2003/0072799 A1 | 4/2003 | Sowden et al. | |

FOREIGN PATENT DOCUMENTS

| | | |
|---|---|---|
| EP | 1 354 694 A2 | 10/2003 |
| GB | 842189 A | 7/1960 |
| JP | 2000-301395 A | 10/2000 |
| JP | 2009-285673 A | 12/2009 |
| WO | 99/33624 A1 | 7/1999 |

OTHER PUBLICATIONS

International Search Report dated Sep. 3, 2015 of international application PCT/EP2015/059946 on which this application is based.

* cited by examiner

*Primary Examiner* — Joseph S Del Sole
*Assistant Examiner* — Thu Khanh T Nguyen
(74) *Attorney, Agent, or Firm* — Walter Ottesen, P.A.

(57) ABSTRACT

A pressure roller station for rotary presses, having two pressure roller receiving pressure roller axles. The pressure roller station includes a guide profile of the pressure roller station configured to be open in the sense that the guide profile, on at least one side of the profile, has lateral parts that are not completely closed. The pressure roller axles are disposed on mutually adjustable upper and lower pressure roller receptacles which are guided by the guide profile. The pressure roller axles are arranged so as to be disposed parallel with the two lateral parts of the guide profile.

15 Claims, 4 Drawing Sheets

PRESSURE ROLLER STATIONS FOR ROTARY PRESSES HAVING TWO PRESSURE ROLLER AXLES FOR RECEIVING PRESSURE ROLLERS

CROSS REFERENCE TO RELATED APPLICATIONS

This application is a continuation application of international patent application PCT/EP2015/059946, filed May 6, 2015, designating the United States and claiming priority from European application 14167415.0, filed May 7, 2014, and the entire content of both applications is incorporated herein by reference.

FIELD OF THE INVENTION

The invention relates to a pressure roller station for rotary presses, having two pressure-roller receiving pressure-roller axles. In order for comparatively large pressing forces to be absorbed, and in order for the press frame to be largely relieved of the pressing-force profile, the frame is formed from an open guide profile, and the pressure-roller axles disposed on mutually adjustable upper and lower pressure roller receptacles which are guided by the guide profile, wherein the pressure-roller axles are present so as to be disposed parallel with two lateral parts of the guide profile. The open guide profile enables good accessibility to those components that are located in the pressure roller station and thus facilitates maintaining, servicing, and replacing components.

BACKGROUND OF THE INVENTION

Split pressure roller stations are usually employed in the case of known rotary presses. Such rotary presses include a frame, a rotor having a drive, a frame housing, supporting corner connections, a head plate, and a drive base, in which the pressure rollers are received by an upper and a lower receptacle device, wherein the upper receptacle device is attached to the head plate of the rotary press, and the lower receptacle device is attached to the drive base of the rotary press.

The two pressure rollers strive to move apart by virtue of the pressing force that arises in the pressing process. The pressure rollers are prevented from doing so by the two receptacle devices on the head piece and on the base of the rotary press, as well as by the two to four pieces of corner connections which interconnect the head piece and the base. The forces that arise in the pressing process are directly introduced into the head piece and the base by way of the rams and the receptacle devices and excite these components by way of the pressing forces to oscillate at frequencies which are in the audible range and thus lead to significant noise emissions.

For example, pressure roller stations in which the frame includes upper and lower transverse supports which are connected by vertical stays are described in U.S. Pat. No. 3,891,375. Furthermore, the pressure roller station described in U.S. Pat. No. 3,891,375 includes two pillars which are disposed between the stays and on which the pressure-roller axles of the pressure rollers are mounted in a sliding manner. The frame is mounted in the press frame so as to be pivotable about a vertical axis, in the closed position forming a component part of the press housing. The frame may be pivoted from the operating position thereof by approximately 90° to the open position, wherein the drive of the pressure rollers is uncoupled and the pressure rollers disengage from the upper ram and the lower ram, respectively. The pressure-roller axle for the upper pressure roller is connected to the upper transverse support by means of a settable spacer. The spacer serves for setting the plunging depth of the upper ram into the dies of the die disk. The pressure-roller axle for the lower pressure roller by way of a shaft is connected to a hydraulic setting unit which for the purpose of setting the tablet thickness and thus the pressing tone acts on the lower pressure roller.

It is disadvantageous that the pressing force is absorbed by the entire press frame, on account of which the configuration of the pressure roller station disclosed in U.S. Pat. No. 3,891,375 is associated with a high and costly effort in terms of material, since the frame of the rotary press and the corner connections have to be embodied so massively that the arising pressing forces can be reliably absorbed by the former. Furthermore, oscillations which may lead to noise disturbances are initiated by the force profile running through the frame. Moreover, the mounting of the pressure-roller axles for the pressure rollers on the two vertical pillars and on the frame that is pivotable in the press frame is soft and resilient such that the pressure roller station described in U.S. Pat. No. 3,891,375 is usable only for minor pressing forces.

A pressure roller station in which the upper and the lower pressure roller of the rotary press are attached to a cylindrically configured guide pillar, wherein the upper and the lower pressure roller are mutually adjustable, is described in U.S. Pat. No. 6,186,762. By way of the pressure roller station described in U.S. Pat. No. 6,186,762, the issue of noise nuisance and the dissipation of pressing force by way of the entire frame is thus solved, but new issues are created on account thereof. In the case of the pressure roller station described in U.S. Pat. No. 6,186,762, it is disadvantageous that the cylindrical guide pillar of the pressure roller station has a cylindrical closed external wall. While this is welcome in the context of the hygiene requirements that are applicable to the pharmaceutical sector, a technician who is entrusted with maintaining the components located in the interior of the guide profile or with replacing components that are in need of replacement in the case of a defect, faces the issue of having to dismantle the pressure roller station in its entirety from the rotary press. By virtue of a total weight of the pressure roller station, which is usually in the range of 500 kg, this is possible only when using lifting gear that is specially made for this purpose. On account thereof, downtime of the rotary tablet press is caused, and personnel are tied up.

It has furthermore been found that the sliding guides of the upper and lower pressure roller receptacle, as described in U.S. Pat. No. 6,186,762, have a mutual play of the components, the play being established by the manufacturing tolerances. This play is no longer capable of being corrected post assembly of the rotary tablet press.

Systems, methods, and devices for producing medicine molds which above all are used for producing tablets, gel caps, and the like, are described in U.S. patent application publication 2003/0072799 A1. Individual modules by way of which methods for producing medicine molds are capable of being carried out are disclosed in the mentioned document. In the case of the pressure frame disclosed in U.S. patent application publication 2003/072799 A1, it is disadvantageous that the guide profiles thereof are not embodied so as to be open, and that the upper and lower pressure roller receptacles are not embodied so as to be mutually adjustable.

U.S. Pat. No. 2,846,723 A describes a rotary tablet press by means of which, in particular, at least two different tableting operations can be performed, and in which more than one pair of pressure rollers is used. U.S. Pat. No. 2,846,723 A discloses an overload protection in which a spiral-shaped helical spring is used.

A press by way of which reproducible pressing and ejecting operations may be simulated is disclosed in WO 99/33624, wherein the press rams are moved by means of replaceable pressure rollers. However, in the case of the press disclosed in WO 99/33624, the pressure rollers are not present as being disposed on a common pressure roller station.

A rotary press in which two pressure rollers which enable the movement of press rams are present is disclosed in GB 842,189 A. Attaching the two pressure rollers in the context of GB 842,189 A is performed in a mutually separate manner in a lower base region, or in an upper roof region of the tablet press, respectively.

A method and a device for monitoring a brake on a spindle are disclosed in EP 1354694, wherein the spindle is driven by a motor, for example an electric motor.

A rotary press having at least one pressure roller unit which by means of a holding device is releasably fastened to a mounting device is disclosed in U.S. Pat. No. 8,550,804.

SUMMARY OF THE INVENTION

It is an object of the invention to provide a pressure roller station which does not have the deficiencies and disadvantages of the prior art, and which moreover guarantees improved accessibility to components of the pressure roller station that require maintenance or replacement.

According to the invention, the object is achieved by a pressure roller station for rotary presses, having two pressure-roller receiving pressure-roller axles, wherein a guide profile of the pressure roller station is configured to be open, and the pressure-roller axles are disposed on mutually adjustable upper and lower pressure roller receptacles which are guided by the guide profile, wherein the pressure-roller axles are present so as to be disposed parallel with two lateral parts of the guide profile. On account thereof, a pressure roller station which is usable for absorbing large pressing forces is advantageously achieved, the open guide profile of the pressure roller station being capable of being configured in an extremely stable manner, wherein a pressing-force profile running by way of the machine frame is avoided. Furthermore, the upper and lower pressure roller receptacles may advantageously not only be adjusted in a mutually independent manner, but also conjointly. The adjustment in parallel of the two pressure roller receptacles at a fixed mutual spacing herein enables a surprisingly simple adjustment of the pressing zone, that is, that region within the die bore in which pressing of the pulverulent pressed material is performed may advantageously be varied in that all regions of the inner side of the die sleeve are passed and are uniformly stressed and worn. It has come as a complete surprise that the service life of a die may be disproportionately extended to an unexpected degree in this manner.

For other applications it may also be preferable for the lower pressure roller receptacle to be adjusted in relation to the upper pressure roller receptacle. On account thereof, a particularly precise and operator-friendly possibility is surprisingly provided for adjusting the web height of the tablets to be produced, on account of which a particularly accurate setting of the tablet thickness is enabled.

In the case of some conventional rotary presses, adjusting the upper and/or the lower pressure roller is performed via an eccentric shaft. Herein, the two pressure rollers lie linearly exactly above one another only in one defined position of the two eccentric shafts. In this operating position, the upper and lower ram heads typically pass the upper and lower dead centers of the pair of pressure rollers simultaneously, such that the same pressing force at a constant pressure holding time is exerted on the pressed material, which is located in the die bore, from above and from below by the press tools. Now, if the position of the upper pressure roller is adjusted by rotating the eccentric shaft downward to the right or the left in order to increase the plunging depth of the upper ram, the upper dead center of the upper pressure roller in relation to the former position of the lower pressure roller moves to the right or the left of the central axis, on account of which the pressing-force action on the pressed material in the die bore is shortened and thus decreased, since the plateaus of the upper and lower ram heads do not simultaneously pass the roller pair, negatively affecting the hardness of the tablet to be produced.

In an embodiment of the pressure roller pillars according to the invention, the upper and lower pressure roller mounts and guides are preferably guided in an axially parallel manner. It is therefore guaranteed that the apexes of the upper and lower pressure roller typically lie on the same axial line in the case of all conceivable adjustments of the pressure rollers, and that thus the constant pressure holding time is exerted on the pressed material at all times, on account of which an optimal tableting result is achieved.

In the context of the invention, the term "open guide profile" refers to the internal structure of the pressure roller station. A profile is open when the former on at least one side of the profile has not completely closed lateral faces, thus open structures or openings. In the context of the invention, a cuboid or a cylinder are closed profiles, for example. The open guide profile of the present invention in particular is not configured so as to be cylindrical and has no round footprint.

According to the invention it is furthermore provided that the pressure-roller axles are disposed in parallel, this meaning that the pressure-roller axles are present so as to be disposed substantially parallel with two lateral parts of the guide profile. A person of average skill in the art knows that the wording "substantially parallel" refers to the production-related tolerances as have been discussed above. It has been demonstrated that surprisingly large pressing forces may be reliably absorbed in the case of such an embodiment of the guide profile having pressure-roller axles which run parallel or substantially parallel therewith, respectively, on account of which a particularly quiet and surprisingly noise-reduced operation of the rotary press according to the invention is guaranteed.

The term "substantially" or "substantially parallel", respectively, or "a substantially right angle" in the context of the invention preferably means that minor deviations from parallelism or from a right angle may be created due to the production process, for example to welding, milling and/or boring operations, wherein a person of average skill in the art in the sector of machinery engineering would still consider the components thus described as being parallel or rectangular. A deviation from parallelism may also result from usage or from the operation of the machine, respectively. A person of average skill in machinery engineering and having experience in the construction of tablet presses knows in which magnitudes such deviations by the usual production tolerances may lie so that a person skilled in the art will still view the assembly as being parallel.

In a preferred embodiment, the two lateral parts are present so as to be disposed in a mutually parallel manner and are connectable to a connection part, wherein the lateral parts and the connection part enclose right angles. A person of average skill in the art knows that the wording "parallel" also can mean minor deviations from an angle of 90°, and how large these deviations may be. A person skilled in the art in the overall context of this invention preferably understands the term "right angle" as a "right angle" or as a "substantially right angle". The comments made with regard to the wording "substantially" in relation to parallelism apply in an analogous manner.

The guide profile is thus an open guide profile in the context of the invention. It is preferable in the context of the invention that the remaining component parts of the pressure roller station are present so as to be disposed on the lateral and connection parts of the open guide profile. By way of the open structure of the guide profile the pressure roller station has surprisingly good accessibility to all components of the pressure roller station that require maintenance and replacement, and high stability and unexpectedly high flexural rigidity.

In the case of a component of the pressure roller station having to be replaced or serviced, for example, it is preferable for this replacement or maintenance process to be possible through the open guide profile without dismantling the pressure roller station in the entirety thereof from the rotary press. To this end, special lifting gear has been required to date. It has come as a complete surprise that a pressure roller station according to the invention having an open guide profile, which is conceived such that the pressure roller station may remain in the rotary press in the case of replacement or maintenance processes, may be provided. On account thereof, significant personnel and cost investments are avoided, and the downtime of the rotary press that is required for the mentioned processes may be shortened to a surprising degree.

Furthermore, the component parts of the open guide profile of the pressure roller station may be produced by milling, this leading to a particularly high precision of the components. The two lateral parts of the open guide profile preferably form the right and the left side face of the housing of the pressure roller station. The connection part which interconnects the two lateral parts is preferably present so as to be disposed in a centric manner between the lateral parts such that the three parts in the plan view represent the shape of a capital letter "H". It is preferable for one of the two openings of the "H" to face the rotor, while the second opening of the "H" lies on that side of the pressure roller station that faces away from the rotor and that in the context of the invention is preferably referred to as the rear side of the pressure roller station. By way of the thus described preferred arrangement of the open guide profile within the pressure roller station a surprisingly space-saving arrangement of the pressure roller station within the rotary press is enabled, on account of which the rotary presses obtained may be configured in a particularly compact manner. On account thereof, volume is advantageously saved during shipping of the rotary presses, for example, or when setting up a multiplicity of rotary presses in a machine shed, for example.

In particular, the shape of the guide profile may preferably be referred to as box-shaped, wherein the two lateral parts and the connection part enclose substantially right angles. However, it may also be preferable for the lateral parts and the connection part to enclose angles which are smaller or larger than 90°. In the context of the invention, such angles are referred to as "substantially rectangular".

Configuring the profile of the guide profile is preferably performed in a manner such that an open structure having advantages for assembly, maintenance, and servicing is created. This represents a departure from the closed construction mode which is described in the prior art. In principle, the pressure roller station as known in the prior art has advantageously been turned "inside out". In this manner, the drives and other component parts of the pressure roller station, such as guides or travel-measuring systems, for example, become surprisingly easily accessible from the outside for troubleshooting and repairs, without having to dismantle the complete pressure roller station.

In a further preferred embodiment of the invention, the pressure roller receptacles are mounted in the open guide profile. The pressure roller receptacles serve for receiving the pressure rollers. By mounting the pressure roller receptacles in the guide profile of the pressure roller station, the pressing forces that arise in the pressing process are preferably absorbed by the guide profile and dissipated downward onto the support plate, uncoupled from the oscillations, of the rotary tablet press. On account thereof, it is avoided that the entire frame of the tablet press is exposed to the pressing forces during the pressing process. This enables a less massive configuration of the base, while saving material. Furthermore, the component parts of the frame, such as the head plate, the corner connections, and the base, are not excited to oscillate, which may lead to noise nuisances if the frequencies lie in the audible range.

In a further embodiment of the invention, the upper pressure roller receptacle is provided with an upper adjustment drive which engages on the open guide profile, and the lower pressure roller receptacle by means of a receptacle and an overload protection is provided with a lower adjustment drive which is mounted in the upper pressure roller receptacle and engages therewith. The receptacle thus preferably represents the link between the upper and the lower pressure roller receptacle. It is preferably provided that the receptacle includes the overload protection, the lower adjustment drive, and the mounting of a spindle. The upper and the lower pressure roller receptacle thus preferably do not directly interact but are interconnected by way of the spindle. The spindle interconnecting the two pressure roller receptacles is preferably a trapezoidal-thread spindle by way of which movements and high tensile forces may be advantageously transmitted. The spindle is preferably mounted on that receptacle to which the overload protection is also fastened.

In a further preferred embodiment of the invention, the lower pressure roller receptacle by way of the overload protection is connected in a force-fitting manner to the receptacle. In the context of the invention it is preferable that the lower pressure roller receptacle and the receptacle are collectively displaced in the case of an adjustment of the spindle, such that the lower pressure roller receptacle and receptacle may preferably form a contiguous part and be conjointly moved.

In terms of construction it is preferable that the upper pressure roller receptacle, the receptacle, and the lower pressure roller receptacle are present so as to be disposed in sequence on a common sliding-guide plane. The receptacles slide like slides, for example, on the common sliding-guide plane. The pressure roller station according to the invention preferably includes flat guides as sliding mounting which in terms of construction are embodied so as to have adjustable play in particular. By virtue of the minimized guide play, the precision of guiding of the pressure roller receptacles and thus positioning of the pressure rollers are improved to a surprising degree.

It is preferable for the plunging depth of the upper pressure ram into the die to be advantageously settable by means of the upper adjustment drive. The web thickness of the tablet to be produced is preferably controlled with the aid of the lower adjustment drive. In the die of a die disk the upper and the lower ram of a rotary press interact in such a manner that a tablet is pressed from the pulverulent material to be pressed that is located between the rams. The lower side of the upper ram, and the upper side of the lower ram herein are shaped such that there is a cavity, the shape of which substantially corresponds to the shape of the tablet, between the rams. Herein, the upper and lower rams are at all times guided by the radial cams and rails such that the upper and the lower ram do not contact one another during the pressing operation. However, the press tools could be damaged by the high pressing forces. It is therefore provided that pulverulent material to be pressed is located at all times between the rams. Tablets often have a greater thickness in the central region than on the peripheries. This thickness may decrease toward the peripheries, wherein the former does not assume the value of zero, as this would mean undesirable contact between the upper and lower rams. On the peripheries thereof, tablets preferably have a thickness which is referred to as a web height or a thickness. This web height or web thickness in a preferred embodiment of the invention may be set in a surprisingly accurate manner by means of the lower adjustment drive, wherein application tests have demonstrated that undesirable contact between the press tools is avoided in a particularly reliable manner by setting the web thickness by means of the lower adjustment drive, while considering the position of the upper adjustment drive.

An overload protection in the context of the invention is preferably a device for protecting the tools in the rotary tablet press, for example if and when the pressing force acting between the two pressure rollers exceeds a previously established value. This previously established value in the context of the invention is preferably referred to as a biasing force.

In a further preferred embodiment of the invention, the overload protection of the pressure roller station is a mechanical overload protection and includes settable and tensionable disk springs. A preferably mechanical configuration of the overload protection by way of disk springs enables an overload protection which has only to be set once, prior to the first use thereof, to the conditions in the rotary press to be provided. However, it may also be preferable for the overload protection to be set to the actual requirements of a pressing process, for example when another type of tablet is being produced, or the press tools are being changed.

The term "disk spring" in the context of the invention preferably refers to a conical annular plate which is stressable in particular in the axial direction and may be stressed both statically as well as dynamically, for example. The employment of disk springs as a component part of a mechanical overload protection is particularly advantageous, since disk springs may absorb high pressing forces such as arise in a rotary press especially in the case of a small available space, and are distinguished by a long service life. A surprisingly good spring effect may be achieved by suitable layering and sequencing of individual disk springs and disk spring packs.

In a further preferred embodiment of the invention, the overload protection may also be a hydraulically operating overload protection. This is particularly advantageous if and when the overload protection is to be rapidly set to the maximum permissible loading of the actually used tools in the case of retooling.

In a further preferred embodiment of the invention, the upper and the lower pressure roller receptacle have sliding guides which are settable and replaceable in order to minimize bearing play. The term "play" in the context of the invention is preferably to be understood as a free space for movement in which a mechanical component post-assembly may be freely moved. It has come as a complete surprise, representing a departure from the prior art, for a pressure roller station to be provided in which play within the sliding guide of the pressure roller station according to the invention is settable during assembly, this not being possible in the case of the pressure roller stations described in the prior art. Rather, the professional world has assumed to date that play in the case of pressure roller stations is solely predefined by the accuracy in production and is not capable of being corrected post-assembly. In the context of the invention it is preferable for the surprising settability of the sliding guides to be enabled by the use of the open guide profile according to the invention and the possibility associated therewith of using milled instead of turned components within a pressure roller station, wherein the milled components in particular have a surprisingly high production accuracy.

Guiding of the pressure roller receptacles is preferably performed by way of sliding guides in the form of slide strips. The term slide strips in the context of this invention preferably refers to a level, thin, and elongate component which advantageously is provided with a slide coating. A person of average skill in the art knows the material of which a face is made, or how a face is modified or treated in order to enable positive sliding.

A further advantage of the pressure roller station according to the invention lies in that the guide strips are replaceable in a particularly simple manner by way of the open construction of the guide profile. In the case of replacement of a guide strip that is caused by wear, only the affected guide strip has to be advantageously replaced, without dismantling the pressure roller station in the entirety thereof. The replacement of components that are prone to wear, such as the guide strips, for example, is thus made possible surprisingly simply, rapidly, and cost-effectively.

In a further preferred embodiment of the invention, the open guide profile has a front side and a rear side, wherein the front side represents that side of the guide profile that faces the rotor, and the front side and the rear side of the guide profile are provided with cladding panels. The pressure roller station according to the invention preferably has an open guide profile which in the plan view represents the capital letter "H". Herein, the lateral faces of the housing of the pressure roller station are preferably formed by the lateral parts of the guide profile. The front side of the guide profile preferably faces the rotor of the rotary press and in particular contains the pressure rollers. The rear side of the guide profile is preferably located on that side that faces away from the rotor of the rotary press, so as to be substantially parallel with the front side.

In order for the open guide profile of the pressure roller station to be closed off such that the hygiene requirements which apply to the pharmaceutical sector are met, the front and the rear side of the guide profile are preferably provided with cladding panels which may be provided with dedicated seal profiles, for example.

In the context of the invention, cladding panels preferably are substantially rectangular, thin, flat and level metal plates from preferably stainless steel, which on the circumference thereof are provided for example with bores by means of which the cladding panels are connected in particular to the housing of the pressure roller station.

The cladding panels are preferably attached to the housing of the pressure roller station by means of connection means, for example screws. Advantageously, screws as metallic connection means are able to be readily cleaned for example in an ultrasonic bath, and thus meet the high requirements set for components in pharmaceutical plants. However, alternative connection means, such as a double-sided adhesive tape, hook-and-loop fasteners, and/or magnetic strips are also conceivable without being limited thereto for other application purposes. The use of screws as a connection means in particular enables the cladding panels to be released and removed from the pressure roller station in a particularly simple manner, on account of which the inboard component parts of the pressure roller station become surprisingly easily accessible. This is advantageous for operator-friendly maintenance or repair of the component parts of the pressure roller station, or for facilitated carrying out of servicing measures, or for replacing worn or defective component parts. As opposed to tablet presses described in the prior art, the entire pressure roller station advantageously no longer has to be dismantled; rather, the cladding panels are removed by releasing the connection means, for example, on account of which the inboard components of the pressure roller station become accessible. Advantageously, the works mentioned above on the pressure roller station according to the invention may be carried out more rapidly by way of the improved accessibility of the inner region of the pressure roller station according to the invention, and the presence of specially trained skilled personnel is required to a lesser degree. A substantial advantage of the invention lies in that downtime of the rotary press, and the investment in personnel required therefor, were able to be reduced to a surprising degree.

In a further embodiment of the invention, the guide profile of the pressure roller station on the lower side thereof has an air cushion. By using an air cushion on the lower side of the pressure roller station according to the invention the friction force between the guide profile and a support plate is reduced to a surprising degree, on account of which a particularly positive movement capability of the pressure roller stations is enabled on a support plate of the rotary press. Thus, repositioning works on the pressure roller stations that to date by virtue of the physical stress by the weight of the pressure roller stations have excluded certain operators may now be even carried out by the latter, on account of which the employment of personnel and the planning of personnel are substantially facilitated.

The pressure roller station in the fully assembled state is preferably attached to a support plate which represents the upper termination of the drive base of the rotary press. Herein, the pressure roller station preferably by way of a fastening flange is connected to a central tensioning unit, and/or by way of connection means, preferably screws, is connected to the oscillation-uncoupled support plate along the circumference of the guide profile of the pressure roller station. In the context of the invention it is preferable for the lower termination of the base toward the floor to be referred to as a base plate while the support plate preferably forms the upper termination of the base.

In the case of servicing, or when another type of tablet is to be produced with the rotary tablet press, for example, it may be necessary for a pressure roller station to be displaced on the base plate, and to be moved to another position. By virtue of the mass of a pressure roller station of several hundreds of kilograms, this is only possible with difficulty. In order for this displacement operation to be facilitated the pressure roller station according to the invention in a preferred embodiment, on the lower side of the pressure roller station, includes an air cushion for reducing the friction force between the guide pillar and a support plate. In the context of the invention, air cushions are preferably produced by means of compressed air between the lower side of the pressure roller station and the support plate. On account thereof, the pressure roller station may be preferably manually displaced advantageously with surprisingly little force and almost without any friction, for example in a horizontal direction, on the base plate.

It is preferable for the air cushion to be activated only when the pressure roller station has to be manually displaced for servicing or conversion purposes for another configuration. In particular, the air cushion does not raise the pressure roller station. Instead, the upwardly acting force of the compressed air is dimensioned such that the friction force that is generated by the weight of the pressure roller station on the base plate is minimized.

The air cushion is created in that preferably a flat cavity on the lower side of the pressure roller station is filled by way of pneumatic pressure. This cavity preferably has a height of 1 to 2 mm, and preferably corresponds to the dimensions of the footprint of the guide profile of the pressure roller station. The pressure for generating the air cushion is preferably in a range from 2 to 4 bar and is preferably provided by a pressure-reduction valve of the pneumatics installation of the rotary press. In order for air to not be able to escape from the sides of the cavity during the build-up of the air cushion, it is preferable for a seal which advantageously seals the cavity in relation to the base plate to be located in an encircling manner about the cavity. The air cushion may be permanently connected, or be temporarily connected by coupling a pressure hose. The supply of compressed air is preferably performed by way of the support plate of the drive base. In the context of the invention it is preferable for the pressure supply to be switched off when the pressure roller station is tensioned or screwed on in the production position. Prior to activating the air cushion, either the automatic tension by way of the central tensioning device, or the screw fastening of the pressure roller station preferably has to be released, this then leading to safe usage of the air cushion.

In a further embodiment of the invention, the pressure roller station includes sensors for measuring the pressing force. To this end, the pressure-roller axles are preferably equipped with strain gauge(s), in order for the pressing force to be determined. In the context of the invention, strain gauges are preferably measuring installations for detecting elongating and/or compressing deformations. It is preferable that the strain gauges change their electrical resistance even in the case of minor deformations, for which reason they are particularly suitable as strain sensors. It is preferable that the strain gauges are attached to components which deform to a minimal degree under stress, in a suitable manner known to a person of average skill in the art. This deformation or elongation advantageously leads to a variation in the resistance of the strain gauge. In a particularly preferred embodiment, the lower pressure-roller axle in the pressure roller station according to the invention is provided with such a strain gauge. However, it may also be preferable for the upper pressure-roller axle or for both pressure-roller axles to be provided with strain gauges. The strain gauges preferably cover a force range from 20 to 100 kN in steps.

In a further embodiment of the invention, the pressure roller station is mounted on a support plate so as to be displaceable, pivotable, and/or about a vertical point of the open guide profile. The center of rotation herein is preferably not inevitably the intersection point of the diagonals of the open guide profile. For example, the center of rotation may be a fixed point which is located laterally on the fastening face of the guide profile.

Pivoting the at least one pressure roller station may preferably be carried out manually by way of the force of an arm, as well as in an automated manner. In the case of manual movement, it is preferable for the pressure roller station to be rotated to be advantageously gripped directly, or a handle is used.

In a further aspect, the invention relates to the use of the pressure roller station according to the invention, wherein the disk springs of the overload protection are set by means of a biasing force such that the lower pressure roller receptacle is released from the receptacle if and when a pressing force acting between the pressure roller receptacles exceeds the biasing force.

In the context of the invention it is preferable for the biasing force to be generated by the layered disk springs. The latter are preferably configured in a compact and robust manner and are suitable for guaranteeing biasing forces up to 150 kN in the available installation space, for example. Layering and sequencing of the springs is required in order for the biasing force and the required lift to be increased in the case of a reaction of the overload protection. The overload protection preferably returns to the initial position thereof in a self-acting manner if and when the pressing force drops below the set biasing force. It is preferable for the force-fitting connection between the lower pressure roller receptacle and the receptacle to be advantageously formed by the spring force of the disk springs that form the overload protection.

Exceeding the biasing force arises for example in the case of so-called “overpressings”, when pressed remains of pressings which cannot be further compressed are present in the die of the rotary press in which the upper and lower rams interact and form the pressing by this interaction. Furthermore, the overload protection may be triggered by excessively filled dies, for example. The pressing operation and the mutual positioning of the pressure rollers are preferably adapted to the filling height and to the features of the pressed mass, in particular to the bulk density thereof and the compression ratio. In the case of overpressing, the pressing force may increase sharply and leave behind damage to tools and to the pressure roller station.

It is preferable for the lower pressure roller receptacle to be displaced downward and to be released from the receptacle, if and when the pressing force reaches or exceeds the spring-biased force or the biasing force of the overload protection, respectively. The spacing between the upper and the lower pressure roller is thus advantageously enlarged, and the pressing force cannot exceed the set, spring-biased force of the overload protection. Once the pressing force drops again, it is preferable in the context of the invention for the lower pressure roller receptacle to again bear on the receptacle in a force-fitting manner. As long as the pressing force is lower than the value of the biasing force, the lower pressure roller receptacle and the receptacle by way of the force-fitting connection which is implemented by the spring force of the disk springs of the overload protection preferably move as a contiguous part if and when the web height of the tablets to be produced is set by way of the lower adjustment drive.

In a further preferred embodiment of the invention, the biasing force is up to 100 kN, preferably up to 125 kN, and particularly preferably up to 150 kN. It has come as a complete surprise that a rotary press of compact construction, having a new arrangement for an overload protection that deviates from the prior art and that has sufficient space for providing biasing forces of the mentioned magnitude, can be provided.

In a further preferred embodiment of the invention, the overload protection includes a safety switch by way of which the rotary press is switched off either if and when the pressing force exceeds the biasing force, or following a settable number of such events. It is preferable for the pressing process to be stopped either immediately or following a settable number of overpressing events, depending on the programming and on the requirements set for the tablet press. Such events arise in the case of overpressings that occur when pressed remains, for example of the tablet powder to be pressed, that cannot be further compressed remain in the die of the rotary tablet press. Furthermore, overpressings may arise, for example, if and when the die in the case of a web height that has been set too low is filled with too large an amount of tablet powder to be pressed. The switch may preferably be a proximity initiator. A proximity initiator is a sensor that reacts upon being approached, that is, in a non-contacting manner without being directly contacted. However, it may also be preferable for the switch to be a micro switch or an optical sensor. A person of average skill in the art knows what other types of switches may be used for the overload protection.

While the pressing operation and the mutual position of the pressure rollers are preferably adapted to the filling height of the tablet powder and to the properties of the pressed mass, for example to the bulk density and the compression ratio, overpressings may arise and by way of the sharply increasing pressing force cause damage to the press tools and the pressure roller station. Depending on the tablet material to be processed, it may be preferable for the tablet press to be switched off in the case of a single overpressing event. However, in other cases it may also be preferable for the tablet press to be stopped only following a pre-established number of overpressing events. This may be indicated when the pressed tablet-powder remnants according to experience and based on the powder structure are released from the dies again in a self-acting manner, for example. Through the use of the switch for the electrical monitoring of the triggering of the overload protection, which moreover can be programmed and thus adapted to the specific requirements of the production process, a particularly flexible use of the overload protection is guaranteed.

In a further embodiment of the invention, the pressure roller station has at least one sensor for measuring travel. The pressure roller station may have one or two sensors, for example. The sensors for measuring travel, or travel-measuring systems, are preferably travel-length measuring systems which in particular continuously record measured values. A person of average skill in the art knows that travel-measuring systems that had high accuracy as well as good reproducibility and linearity may be used, and that such travel-measuring systems may be selected from the group measuring in a non-contacting, contacting, magnetic, optical, or inductive manner.

It is preferred that by terminating the open guide profile of the pressure roller station by means of cladding panels, the sensors for measuring travel, in particular, and the adjustment drives together with the transmission members thereof, such as the spindles, may become readily accessible from the outside by removing the cladding panels, and in the case of servicing or assembling may be replaced in a simple manner without the pressure roller station in its entirety having to be replaced.

Following the removal of the cladding panels on the front and the rear side of the guide profile it is preferably possible to verify the functional capability of the travel-measuring systems, to check and/or replace electrical connections. It is furthermore preferable to check and replace motors and gearboxes of the adjustment drives for adjusting the plunging depth and the web thickness without dismantling the entire pressure roller station. Moreover, the replacement of spindles for adjusting the plunging depth and the web thickness, and of the upper and lower pressure-roller axles together with the pressure rollers is advantageously also possible.

In a further embodiment of the invention, the upper adjustment drive for adjusting the plunging depth has a spindle, which is connected in a form-fitting and/or force-fitting manner to the upper adjustment drive, and a releasable brake which in the case of actuation blocks the spindle in relation to the housing of the adjustment drive. On account of this blocking, the flow of force between the upper pressure roller receptacle and the upper adjustment drive is advantageously interrupted such that a surprisingly large braking effect is achieved.

In a further embodiment of the invention, the lower adjustment drive for setting the web thickness has a spindle, which is connected in a form-fitting and/or force-fitting manner to the lower adjustment drive, and a brake which in the case of actuation blocks the spindle in relation to the receptacle. On account thereof, the flow of force between the lower pressure roller receptacle and the lower adjustment drive is advantageously interrupted, wherein the brake herein too exerts a surprisingly large blocking effect.

In the prior art, the brakes for arresting the drives in the tensionless state become effective at the respective last point of the flow of force on the respective motor. It has come as a surprise that the brakes in the pressure roller station according to the invention may be disposed such that they become effective directly on the spindle as a force-transmission element, representing a departure from the prior art that to date has not been considered by the professional world. Therefore, the brakes in the case of the pressure roller station according to the invention are preferably disposed directly on the spindles for setting the web height and the plunging depth. Thus, long transmission paths of the braking effect are surprisingly avoided, and a rotary movement of the spindles in the case of the pressure rollers striving apart is prevented in a particularly effective manner by arresting the spindles.

By way of a configuration of the inboard components of the pressure roller station according to the invention, the motor and the gearbox have only to operate counter to the pressing force during the pressing process upon adjustment of the upper pressure roller receptacle and of the lower pressure roller receptacle. Following the completion of the adjustment operation, the motors and the gearboxes in the braked position advantageously are again switched so as to be free of torque and of forces, and are thus not subject to the pressing force and to variations of the pressing force.

Preferably, the brakes may be embodied to be both form-fitting as well as force-fitting. It is preferable for the releasable brakes in the non-actuated, tension-free or pressure-free state to be braked, while the brakes in the actuated state are opened for the adjustment operation of the respective adjustment drive.

In a further embodiment of the invention, actuation of the brake is performed electrically, pneumatically, and/or hydraulically. Actuation of the brake is preferably performed pneumatically. However, it may also be preferable for electrical or hydraulic actuation to be performed. It has come as a surprise that each automatically operating brake actuation may be employed in a pressure roller station such that the brake becomes effective directly on the force-transmission element and need not be present so as to be disposed behind the motor and the gearbox.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
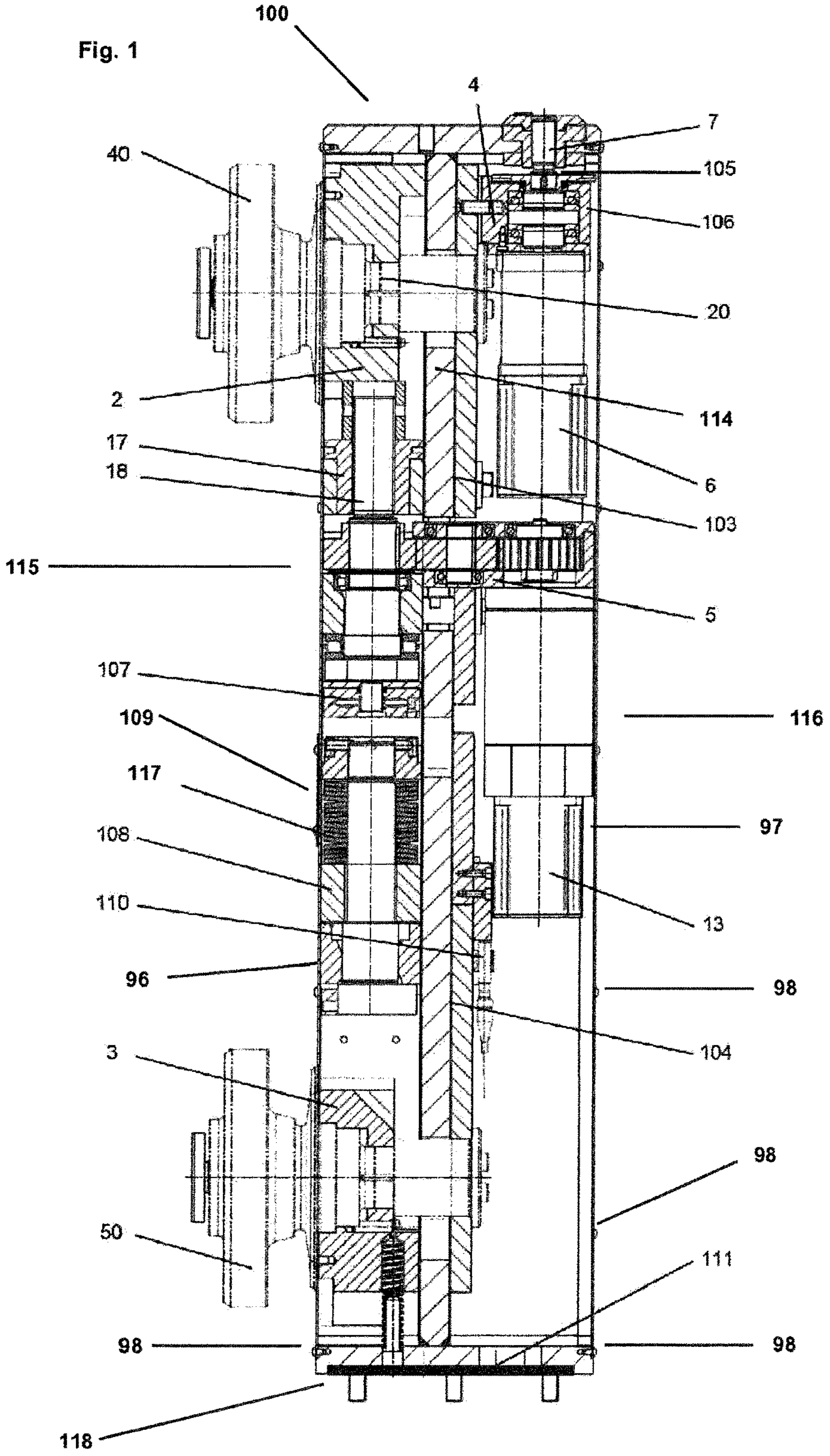
FIG. 1 shows a longitudinal section through a preferred embodiment of the pressure roller station.

FIG. 1 shows a section through the pressure roller station 100 according to the invention. The front side 115, the rear side 116, and the lower side 118 of the pressure roller station 100 are illustrated in particular. Herein, the front side 115 of the pressure roller station 100 faces the rotor 91 of the tablet press 90. The rear side 116 of the pressure roller station 100 is disposed so as to be substantially parallel therewith, facing away from the rotor 91 of the tablet press 90. A person of average skill in the art knows that the term "parallel" also includes "substantially parallel" faces, wherein "substantially parallel" faces have a deviation from parallelism of preferably not more than 6°, most preferably of not more than 3°. Furthermore illustrated are the cladding panels (96, 97) which close off the front side 115 and the rear side 116 of the open guide profile 1, and are fastened to the housing of the pressure roller station 100 by way of connection means 98, in particular screws. Some of the connection means 98 are marked by way of example in FIG. 1.

The section in FIG. 1 runs centrically through the guide pillar 1 of the pressure roller station 100 such that the parallel lateral parts (112, 113) of the open guide profile 1 cannot be seen in FIG. 1. However, the connection part 114 of the guide profile 1 that interconnects the two lateral parts (112, 113) can be seen. The connection part 114 lends the guide profile 1 the particular stability thereof. Pressure roller receptacles (2, 3) which receive and hold the pressure rollers (40, 50) are located on this connection part 114 of the guide pillar 1. The pressure roller receptacles (2, 3) are mounted in the guide profile 1. The upper pressure roller receptacle 2 has an upper sliding guide 103, the lower pressure roller receptacle 3 has a lower sliding guide 104, by way of which guides (103, 104) the pressure roller receptacles (2, 3) are guided in a slidable manner on a common sliding plane. Herein, the sliding guides (103, 104) are made of milled high-precision components which upon assembly of the sliding guides (103, 104) enable setting of play that is correctable at a later stage. The two pressure rollers (40, 50) may be mutually adjusted, this being effected in particular by the spindle 18. On account thereof, the web thickness may be set.

The pressure roller receptacles (2, 3) are connected to the sliding guides (103, 104) by way of pressure-roller axles 20. Furthermore, the upper pressure roller receptacle 2, having an upper adjustment drive 4 that engages on the guide profile, is attached in the upper region of the guide profile 1. The upper adjustment drive 4 serves for setting the upper pressure roller 40 and thus for setting the plunging depth of the upper ram 56 which is impinged by the upper pressure roller 40, and for adjusting the upper pressure roller 40 and the lower pressure roller 50 in a collective, that is, parallel, manner, at a fixed spacing. On account thereof, the pressing zone of the rotary tablet press 90 may be set. This is advantageous, because different regions of the dies in the die disk may be selected and targeted on account thereof. On account thereof, different regions of the die are stressed during the pressing operation, on account of which the service life of the dies may be extended by utilizing the entire die height.

The lower pressure roller receptacle 3 by means of a receptacle 108 and an overload protection 109 is provided with a lower adjustment drive 5, wherein the lower adjustment drive 5 is mounted on the upper pressure roller receptacle 2, engaging on this upper pressure roller receptacle 2. Herein, the upper and the lower pressure roller receptacle (2, 3) by way of the spindle 18 do not directly interact. The spindle 18 is mounted on the receptacle 108 to which the overload protection 109 is also fastened. The lower pressure roller receptacle 3 is indirectly connected to the receptacle 108 in a force-fitting manner. The lower adjustment drive 5 for the lower pressure roller 50, together with the spindle 18, serves for setting the web thickness in relation to the upper pressure roller 40.

The gear motor 6 interacts with a further spindle 7 which serves for setting the plunging depth of the upper rams 56. The brake for the plunging-depth setting 105 and the brake for the web-thickness setting 107 are attached directly on the spindles (7, 18). Thus, the brakes (105, 107) act directly on the force-transmission elements, that is, on the spindles (7, 18).

If and when the two pressure rollers (40, 50) by way of the arising forces strive apart during the pressing process, the spindles (7, 18) also strive to rotate. The spindles (7, 18) are prevented from thus moving by the brakes (105, 107). Herein, the spindle 7 for setting the plunging depth is blocked in relation to the housing 106 of the upper adjustment drive 4, on account of which the flow of force between the upper pressure roller receptacle 2 and the adjustment drive 4 is interrupted. The spindle 18 for setting the web thickness is blocked in relation to the receptacle 108, resulting in an interruption of the flow of force between the lower pressure roller receptacle 3 and the lower adjustment drive 5.

The upper pressure roller receptacle 2, under actuation of the gear motor 6 and in interaction with the spindle 7 and the upper sliding guide 103, may be vertically moved up and down in the guide pillar 1, on account of which the plunging depth of the upper rams 56 is set. The lower pressure roller receptacle 3, under actuation of the gear motor 13 and in interaction with the spindle 18 and the lower sliding guide 104, may be vertically moved up and down in the guide pillar 1, on account of which the web thickness is set.

A mechanical overload protection 109 by way of which and by means of tensionable disk springs 117 a biasing force is generated is furthermore illustrated in FIG. 1. This biasing force effects the force-fitting connection between the lower pressure roller receptacle 3 and the receptacle 108. The overload protection 109 protects the press tools, such as the upper rams 56 and the lower rams 57, for example, from stresses by too large pressing forces. The overload protection 109 is formed by layered and successively connected disk springs 117 or by packs of disk springs. Should the pressing force between the pressure rollers (40, 50) exceed the biasing force that is set on the overload protection 109, the lower pressure roller receptacle 3 is released from the receptacle 108 and slides downward. Thus, the pressing force cannot exceed the biasing force, on account of which damage to the press tools (56, 57) and to the pressure rollers (40, 50) of the rotary press 90 is prevented.

The overload protection 109 is provided with a switch 110 by way of which the rotary press 90 may be switched off. This may happen either when the pressing force between the pressure rollers (40, 50) exceeds the biasing force of the overload protection 109, or when a settable number of overpressing events arise.

FIG. 1 furthermore shows an air cushion 111 which is present as being attached to the lower side of the pressure roller station 100. This air cushion 111 enables movement of the pressure roller station 100 on a support plate 29 having a reduced friction force. The air cushion 111 is generated in a cavity below the pressure roller station 100, wherein the compressed air supply may be permanently or temporarily connected. The compressed air supply of the air cushion 111 is preferably performed by way of a supply connector of the pressure roller station 100. This is advantageous, because the pressure conditions may be adapted to the requirements pertaining to the generation of an air cushion 111 that is adapted to the pressure roller station 100. However, it may also be preferable for the compressed air supply to be performed by way of the support plate 29 of the rotary tablet press 90.

Figure 2:
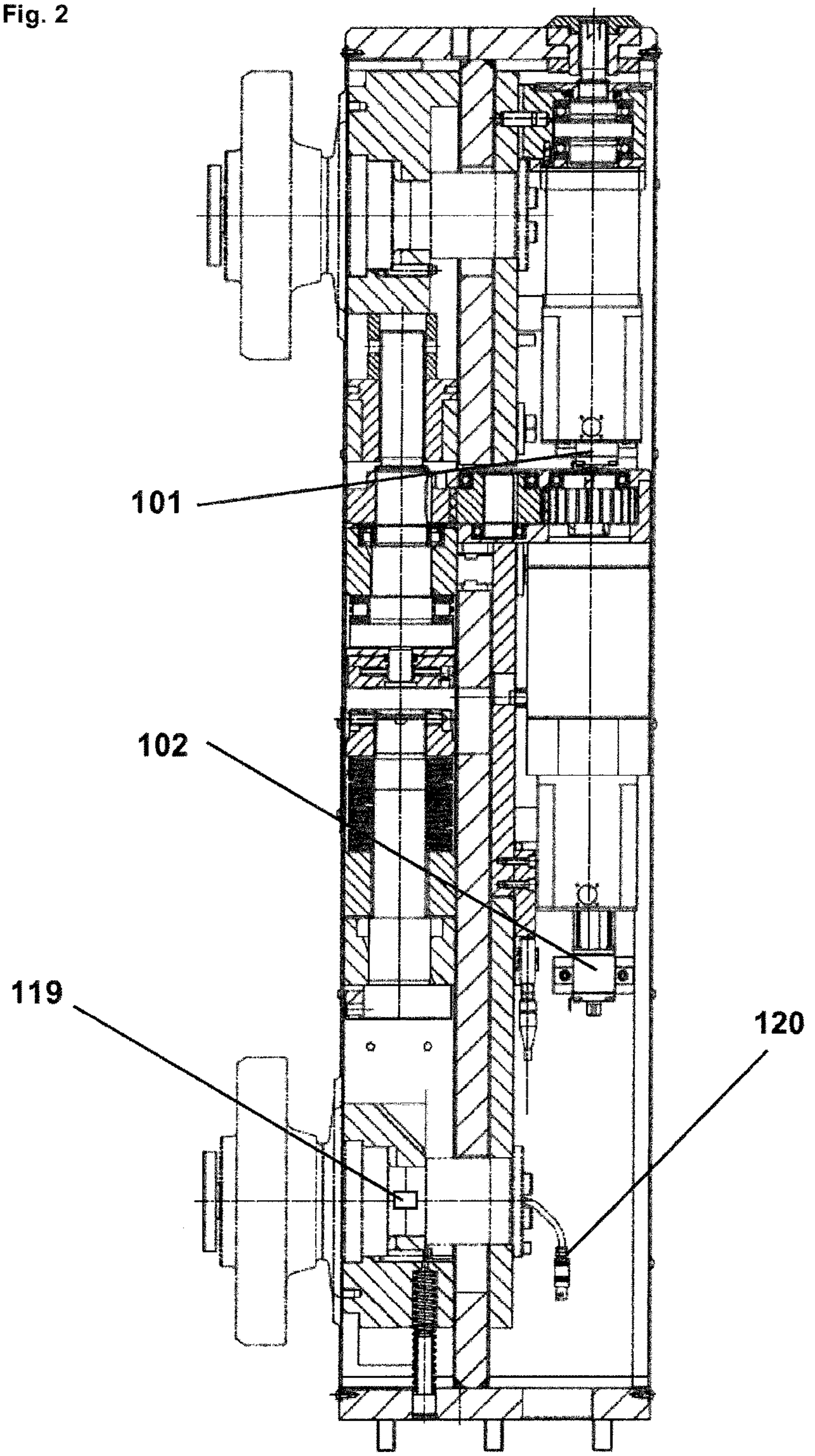
FIG. 2 shows a longitudinal section through a preferred embodiment of the pressure roller station, wherein the position of the sensors for measuring travel and pressing force are illustrated.

FIG. 2 shows a longitudinal section through a preferred embodiment of the pressure roller station, wherein the position of the sensors for measuring travel (101, 102) and for measuring pressing force 119 are illustrated. The positions of the sensors for measuring travel (101, 102), respectively the travel-measuring systems, are illustrated in particular in FIG. 2. These herein are preferably travel-length measuring systems which continuously record measured values. The sensor for measuring pressing force 119 which is a strain gauge may furthermore be seen. The sensor for measuring pressing force 119 in the embodiment of the invention shown in FIG. 2 is attached to the lower pressure roller receptacle 3. The strain gauge upon mechanical deformation varies the electrical resistance thereof, wherein this variation in resistance is used as an electric signal for determining the pressing force. This electric signal is relayed by way of a line connector 120 for the electric signal of the pressing-force sensor.

Figure 3:
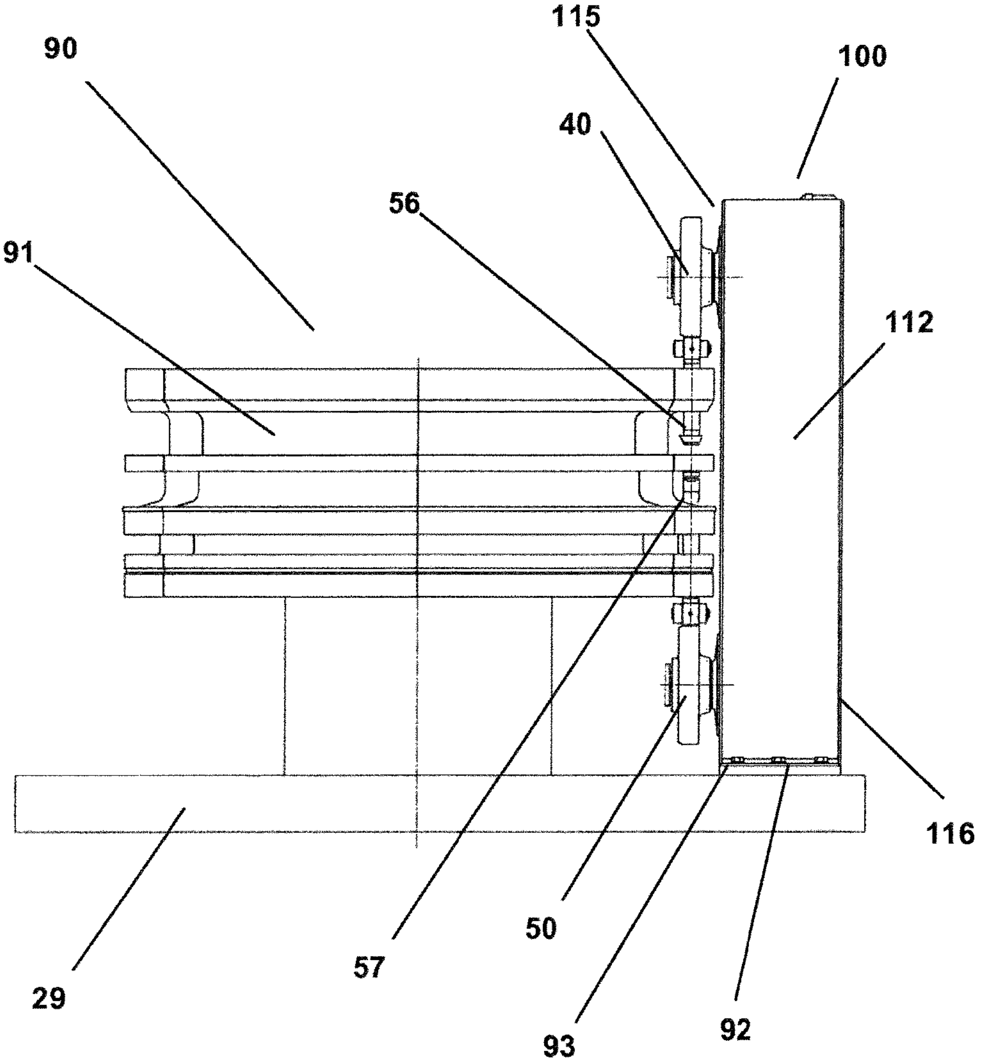
FIG. 3 shows a side view of a preferred embodiment of the pressure roller station; and, FIG. 4 shows a plan view of a preferred embodiment of the pressure roller station.

FIG. 3 shows a side view of a preferred embodiment of the pressure roller station 100. It can be seen that the pressure roller station 100 in this preferred embodiment is fastened to the support plate 29 of the rotary press 90 by means of a fastening flange 92 and of connection means 93. FIG. 3 furthermore shows one of the two lateral faces 112 of the open guide profile 1 of the pressure roller station 100, as well as the front side 115 and the rear side 116 of the latter. Herein, the front side 115 of the pressure roller station 100 faces the rotor 91 of the rotary tablet press 90, while the rear side 116 is located on that side of the pressure roller station 100 that faces away from the rotor 91. FIG. 3 moreover shows the upper 40 and the lower 50 pressure roller of the pressure roller station 100. FIG. 3 furthermore shows the upper 56 and the lower 57 press tools, that is, the upper rams 56 and the lower rams 57 of the rotary tablet press 90, which by means of the upper 40 and the lower 50 pressure roller are compressed for the purpose of forming tablets.

Figure 4:
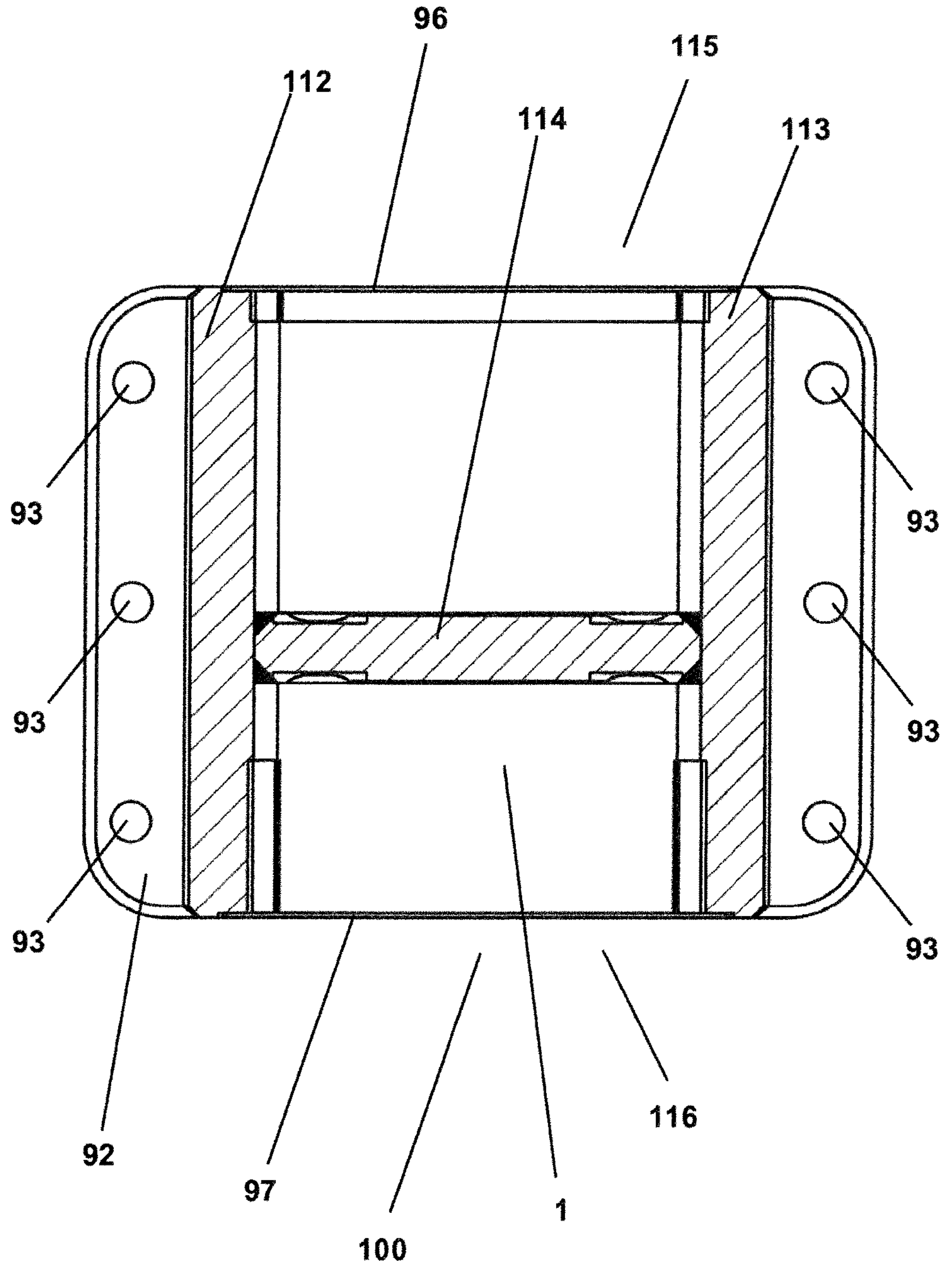

FIG. 4 shows a plan view of a preferred embodiment of the pressure roller station 100 in which the H-shape of the open guide profile 1 can be clearly seen, the guide profile being formed by the two substantially parallel lateral parts (112, 113) and by the connection part 114 which runs substantially perpendicular thereto. Herein, the lateral parts (112, 113) form the lateral faces of the pressure roller station 100. In this plan view, the fastening flange 92 and the connection means 93 by way of which the pressure roller station 100 is fastened to the support plate 29 of the rotary tablet press 90 can also be seen. FIG. 4 highlights the open structure of the guide profile 1 which on the front side 115 and on the rear side 116 of the pressure roller station 100 is closed off in each case by one cladding panel (96, 97).

It is understood that the foregoing description is that of the preferred embodiments of the invention and that various changes and modifications may be made thereto without departing from the spirit and scope of the invention as defined in the appended claims.

LIST OF REFERENCE SIGNS

1 Open guide profile
2 Upper pressure roller receptacle
3 Lower pressure roller receptacle
4 Adjustment drive for plunging depth
5 Adjustment drive for web thickness
6 Gear motor
7 Spindle
13 Gear motor
17 Spindle nut
18 Spindle
20 Pressure-roller axle
29 Support plate
40 Upper pressure roller
50 Lower pressure roller
56 Upper ram
57 Lower ram
90 Rotary tablet press
91 Rotor
92 Fastening flange
93 Connection means for fastening flange on the support plate (29)
95 Frame
96 Cladding panel
97 Cladding panel
98 Connection means for cladding panel
100 Pressure roller station
101 Travel-measuring system
102 Travel-measuring system
103 Sliding guide with settable play of the upper pressure roller receptacle 2
104 Sliding guide with settable play of the lower pressure roller receptacle 3
105 Brake of plunging-depth setting
106 Housing of the adjustment drive (4)
107 Brake of the web-thickness setting
108 Receptacle of the overload protection
109 Overload protection
110 Signal feature (switch) for triggering overload protection
111 Air cushion
112 Lateral part of the open guide profile
113 Lateral part of the open guide profile
114 Connection part of the open guide profile
115 Front side of the pressure roller station
116 Rear side of the pressure roller station
117 Tensionable disk springs
118 Lower side of the open guide profile
119 Sensor for measuring the pressing force
120 Line connector for the electric signal of the pressing-force sensor

What is claimed is:

1. A pressure roller station for rotary presses, the pressure roller station comprising:

a first pressure roller axle configured to receive a pressure roller;

a second pressure roller axle configured to receive a pressure roller;

a guide profile having a first lateral part arranged at a first side of said guide profile and a second lateral part disposed at a second side of said guide profile;

said guide profile being adapted to be open such that at least one of said first lateral part at said first side and said second lateral part at said second side is not completely closed;

an upper pressure roller receptacle configured to accommodate said first pressure roller axle;

a lower pressure roller receptacle configured to accommodate said second pressure roller axle;

said upper pressure roller receptacle and said lower pressure roller receptacle being configured to be mutually adjustable and to be guided by said guide profile; and, said first pressure roller axle and said second pressure roller axle being disposed parallel to said first lateral part and said second lateral part.

2. The pressure roller station of claim 1 further comprising:

a connection part; and, said first lateral part and said second lateral part being arranged in a mutually parallel manner and each being configured to be connectable to said connection part, wherein said connection part encloses right angles with each of said first and said second lateral parts.

3. The pressure roller station of claim 1 further comprising:

a receptacle;

an overload protection;

said upper pressure roller receptacle having an upper adjustment drive configured to engage said guide profile adapted to be open;

said lower pressure roller receptacle being provided with a lower adjustment drive via said receptacle and said overload protection; and, said lower adjustment drive being mounted in said upper pressure roller receptacle and configured to engage therewith.

4. The pressure roller station of claim 3, wherein said lower pressure roller receptacle is connected to said receptacle in a force-fitting manner via said overload protection.

5. The pressure roller station of claim 3, wherein said overload protection is a mechanical overload protection and includes a plurality of disk springs configured to be settable and tensionable.

6. The pressure roller station of claim 3, wherein said overload protection is a hydraulic overload protection.

7. The pressure roller station of claim 1 further comprising:

said upper pressure roller receptacle having a first slide guide;

said lower pressure roller receptacle having a second sliding guide; and, said first and said second sliding guides being configured to be settable and replaceable so as to minimize bearing play.

8. The pressure roller station of claim 1, wherein:

said guide profile has a front side and a rear side;

said front side is that side of said guide profile configured to face a rotor;

said front side has a first cladding panel; and, said rear side has a second cladding panel.

9. The pressure roller station of claim 1, wherein said guide profile has an air cushion on a lower side thereof.

10. The pressure roller station of claim 1 further comprising:

a support plate; and, the pressure roller station being mounted on said support plate so as to be at least one of displaceable, pivotable and rotatable about a vertical point of said open guide profile.

11. A method of utilizing a pressure roller station for rotary presses, the pressure roller station comprising: a first pressure roller axle configured to receive a pressure roller; a second pressure roller axle configured to receive a pressure roller; a guide profile having a first lateral part arranged at a first side of said guide profile and a second lateral part disposed at a second side of said guide profile; said guide profile being adapted to be open such that at least one of said first lateral part at said first side and said second lateral part at said second side is not completely closed; an upper pressure roller receptacle configured to accommodate said first pressure roller axle; a lower pressure roller receptacle configured to accommodate said second pressure roller axle; said upper pressure roller receptacle and said lower pressure roller receptacle being configured to be mutually adjustable and to be guided by said guide profile; said first pressure roller axle and said second pressure roller axle being disposed parallel to said first lateral part and said second lateral part; a receptacle; an overload protection; said upper pressure roller receptacle having an upper adjustment drive configured to engage said guide profile adapted to be open; said lower pressure roller receptacle being provided with a lower adjustment drive via said receptacle and said overload protection; and, said lower adjustment drive being mounted in said upper pressure roller receptacle and configured to engage therewith, the overload protection including a plurality of disk springs, the method comprising the step of:

setting the disk springs of the overload protection via a biasing force such that the lower pressure roller receptacle is released from the receptacle if and when a pressing force acting between the first pressure roller receptacle and the second pressure roller receptacle exceeds the biasing force.

12. The method of claim 11, wherein the overload protection includes a switch, the method further comprising the step of:

switching off the rotary press via said switch either if and when a pressing force exceeds the biasing force or following a settable number of such events.

13. The method of claim 11, wherein the pressure roller station has at least one of a sensor configured to measure displacement and a sensor configured to measure a pressing force; and, the upper and lower adjustment drives and the at least one sensor are accessible and replaceable by removing cladding panels without having to dismantle the entire pressure roller station from the rotary press.

14. The method of claim 11, wherein the upper adjustment drive is configured to adjust a plunging depth and includes a spindle; the spindle is connected in at least one of a form-fitting and a force-fitting manner to the upper adjustment drive; the upper adjustment drive has a housing; and, the pressure roller station further includes a brake configured to, in the case of actuation, block the spindle in relation to the housing.

15. The method of claim 11, wherein the lower adjustment drive is configured for setting a web thickness; the lower adjustment drive has a spindle connected in at least one of a form-fitting and a force-fitting manner to the lower adjustment drive; and, the pressure roller station further includes a brake configured to, in the case of actuation, block the spindle in relation to the receptacle.

* * * * *